United States Patent
Yoshida et al.

(10) Patent No.: US 10,362,124 B2
(45) Date of Patent: *Jul. 23, 2019

(54) GEO-LOCATING INDIVIDUALS BASED ON A DERIVED SOCIAL NETWORK

(71) Applicant: Axon Vibe AG, Lucerne (CH)

(72) Inventors: Katherine Yoshida, New York, NY (US); Thomas Annicq, New York, NY (US); Roman Oberli, Sarnen (CH); Jacopo Tagliabue, New York, NY (US)

(73) Assignee: AXON VIBE AG, Lucerne (CH)

(*) Notice: Subject to any disclaimer, the term of this patent is extended or adjusted under 35 U.S.C. 154(b) by 0 days.

This patent is subject to a terminal disclaimer.

(21) Appl. No.: 16/224,094

(22) Filed: Dec. 18, 2018

(65) Prior Publication Data

US 2019/0124166 A1    Apr. 25, 2019

Related U.S. Application Data

(63) Continuation of application No. 15/674,778, filed on Aug. 11, 2017.

(Continued)

(51) Int. Cl.
| | |
|---|---|
| *H04W 4/02* | (2018.01) |
| *G06N 20/00* | (2019.01) |
| *H04L 29/08* | (2006.01) |

(52) U.S. Cl.
CPC ............ *H04L 67/18* (2013.01); *G06N 20/00* (2019.01); *H04L 67/22* (2013.01); *H04W 4/023* (2013.01)

(58) Field of Classification Search
CPC ....... H04W 4/023; G06N 20/00; H04L 67/18; H04L 67/22

(Continued)

(56) References Cited

U.S. PATENT DOCUMENTS

| | | | |
|---|---|---|---|
| 6,275,707 B1 * | 8/2001 | Reed | G01S 5/0072 342/357.31 |
| 6,968,179 B1 | 11/2005 | De Vries | |

(Continued)

FOREIGN PATENT DOCUMENTS

| | | |
|---|---|---|
| WO | WO-2004051580 A1 | 6/2004 |
| WO | WO-2015056269 A1 | 4/2015 |

OTHER PUBLICATIONS

International Search Report and Written Opinion issed by U.S. Patent and Trademark Office as Searching Authority in International Application No. PCT/US16/57846, daed Jan. 17, 2017 (9 pages).

(Continued)

*Primary Examiner* — William Nealon
(74) *Attorney, Agent, or Firm* — Wilmer Cutler Pickering Hale and Dorr LLP

(57) ABSTRACT

Techniques for determining a location of a user based on locations of other users. First user location information and second user location information is received. The first user location information includes a first centroid and first radius associated with a first user position and the second user location information includes a second centroid and second radius associated with a second user position. The second user is further associated with second user venue information. A venue correlation score between the first user and the second user is determined based on an amount of overlap between the first user radius and the second user radius and a social metric indicating a strength of a social relationship between the first user and second user. Venue information for the first user is created based on the second user venue information when the relationship score exceeds a threshold value.

20 Claims, 7 Drawing Sheets

Related U.S. Application Data

(60) Provisional application No. 62/373,664, filed on Aug. 11, 2016.

(58) Field of Classification Search
USPC .......................................................... 455/456.1
See application file for complete search history.

(56) References Cited

U.S. PATENT DOCUMENTS

| | | | | |
|---|---|---|---|---|
| 8,447,516 | B1* | 5/2013 | Koulomzin | G01S 5/02 |
| | | | | 455/456.2 |
| 8,521,128 | B1* | 8/2013 | Welsh | H04W 4/21 |
| | | | | 455/404.2 |
| 8,761,797 | B1* | 6/2014 | Norton | H04W 4/023 |
| | | | | 455/456.1 |
| 8,923,887 | B2* | 12/2014 | McKiou | H04L 12/185 |
| | | | | 455/456.3 |
| 9,167,384 | B2* | 10/2015 | Takaoka | H04M 1/2745 |
| 9,369,901 | B2* | 6/2016 | Park | G06Q 50/01 |
| 9,380,417 | B1* | 6/2016 | Boyle | H04W 4/023 |
| 9,743,376 | B2* | 8/2017 | Paek | H04W 4/02 |
| 9,823,989 | B2* | 11/2017 | Yu | G06F 3/00 |
| 9,888,347 | B1* | 2/2018 | Tan | H04W 4/023 |
| 2003/0186710 | A1* | 10/2003 | Muhonen | H04W 4/02 |
| | | | | 455/456.5 |
| 2006/0240774 | A1* | 10/2006 | Blom | H04W 8/005 |
| | | | | 455/41.1 |
| 2006/0270419 | A1 | 11/2006 | Crowley et al. | |
| 2007/0225911 | A1 | 9/2007 | Chanick | |
| 2009/0125321 | A1 | 5/2009 | Charlebois et al. | |
| 2010/0004005 | A1* | 1/2010 | Pereira | H04W 4/02 |
| | | | | 455/457 |
| 2010/0256948 | A1 | 10/2010 | Wright | |
| 2010/0262487 | A1 | 10/2010 | Edwards et al. | |
| 2011/0117922 | A1* | 5/2011 | Reitsma | H04W 64/00 |
| | | | | 455/456.1 |
| 2011/0176523 | A1* | 7/2011 | Huang | G01S 5/02 |
| | | | | 370/338 |
| 2011/0238514 | A1 | 9/2011 | Ramalingam et al. | |
| 2012/0008526 | A1* | 1/2012 | Borghei | H04W 4/021 |
| | | | | 370/254 |
| 2012/0047102 | A1 | 2/2012 | Petersen et al. | |
| 2012/0054180 | A1 | 3/2012 | Priyadarshan et al. | |
| 2012/0066316 | A1* | 3/2012 | Petersen | H04L 67/22 |
| | | | | 709/206 |
| 2012/0108259 | A1* | 5/2012 | Weiss | G06Q 30/0261 |
| | | | | 455/456.1 |
| 2012/0115506 | A1* | 5/2012 | Bentley | H01Q 5/00 |
| | | | | 455/456.1 |
| 2012/0239479 | A1 | 9/2012 | Amaro et al. | |
| 2012/0309410 | A1* | 12/2012 | Marti | H04W 4/029 |
| | | | | 455/456.1 |
| 2013/0024471 | A1 | 1/2013 | Mitrovic | |
| 2013/0054698 | A1* | 2/2013 | Lee | G06Q 30/0259 |
| | | | | 709/204 |
| 2013/0137464 | A1* | 5/2013 | Kramer | G06Q 30/02 |
| | | | | 455/456.3 |
| 2013/0150089 | A1* | 6/2013 | Kuwahara | H04L 67/2871 |
| | | | | 455/456.3 |
| 2013/0288703 | A1* | 10/2013 | Yang | G01S 5/0054 |
| | | | | 455/456.1 |
| 2013/0337843 | A1* | 12/2013 | Fix | H04W 64/00 |
| | | | | 455/456.5 |
| 2014/0171039 | A1 | 6/2014 | Bjontegard | |
| 2014/0207582 | A1 | 7/2014 | Flinn et al. | |
| 2015/0154641 | A1 | 6/2015 | Weiss | |
| 2015/0156245 | A1* | 6/2015 | Risch | G06Q 30/06 |
| | | | | 709/219 |
| 2015/0233715 | A1* | 8/2015 | Xu | H04W 4/21 |
| | | | | 701/408 |
| 2016/0148299 | A1 | 5/2016 | Caralis et al. | |
| 2016/0182424 | A1* | 6/2016 | Maginnis | H04W 4/029 |
| | | | | 709/206 |
| 2016/0256948 | A1 | 9/2016 | Ando et al. | |
| 2017/0111462 | A1 | 4/2017 | Oberli et al. | |

OTHER PUBLICATIONS

International Search Report and Written Opinion issued by the U.S. Patent and Trademark Office as Searching Authority, issued in International Application Nuimber PCT/US16/59328, dated Jan. 3, 2017 (8 pages).

International Search Report and Written Opinion issued by the U.S. Patent Office as International Searching Authority in PCT/US17/20733, dated May 11, 2017 (8 pages).

International Search Report and Written Opinion issued in International Application No. PCT/US2017/046443; issued by the U.S. Patent and Trademark Office as International Searching Authority; dated Oct. 23, 2017 (14 pages).

\* cited by examiner

GEO-LOCATING INDIVIDUALS BASED ON A DERIVED SOCIAL NETWORK

CROSS REFERENCE TO RELATED APPLICATIONS

This application is a continuation of U.S. patent application Ser. No. 15/674,778 entitled "GEO-LOCATING INDIVIDUALS BASED ON A DERIVED SOCIAL NETWORK," filed on Aug. 11, 2017, which claims priority to U.S. Provisional Application No. 62/373,664, filed Aug. 11, 2016, the contents of each of which are incorporated herein by reference.

TECHNICAL FIELD

Embodiments of the present invention generally relate to analyzing user location data, and, in particular, to geo-locating individuals based on a derived social network.

BACKGROUND

Despite the ability of mobile phones to record a user's geo-location (latitude, longitude) at points in time, it remains a challenge to pinpoint the venue at which an individual has dwelled. This is because location points are often lacking both in density and in accuracy.

Mobile phones often record location sparingly due to battery constraints (frequent location points will drain the phone's battery). When they are recorded, the points are not always accurate, often containing a significant amount of uncertainty (e.g., 100 meter radius). This uncertainty is compounded in densely populated urban areas, where there may exist many venues within the uncertainty radius. Therefore, it is still difficult to know at which venue the user is actually dwelling.

SUMMARY OF THE INVENTION

Systems and methods are disclosed for determining a location of a user based on locations of other users. In some embodiments, a computing device determines a first user location information associated with a first user from a first user device, the first user location information including a first centroid and first radius associated with a first user position. In some embodiments, the computing device receives second user location information associated with a second user from a second user device, the second user location information including a second centroid and second radius associated with a second user position, the second user further associated with second user venue information. In some embodiments, the computing device determines a venue correlation score between the first user and the second user based on an amount of overlap between the first user radius and the second user radius and a social metric indicating a strength of a social relationship between the first user and second user, the social relationship being defined at least in part by a number of times and an amount of time a first user is in a proximate location to the second user prior to receiving the first user location information and the second user location information. In some embodiments, the computing device, creates venue information for the first user based on the second user venue information when the relationship score exceeds a threshold value.

In some embodiments, the first centroid is associated with a first latitude and longitude, the first radius is associated with an accuracy of a location of the first centroid, the second centroid is associated with a second latitude and longitude, the second radius is associated with an accuracy of a location of the second centroid. In some embodiments, the first user information further includes a first user device identifier and a first user duration, the first user duration including a start time and end time corresponding to the first user being associated with the first centroid. In some embodiments, the second user information further includes a second user identifier and a second user duration, the second user duration associated with start time and end time corresponding to the second user being associated with the second centroid. In some embodiments, the venue correlation score is based on an amount of overlap between the first user duration and the second user duration. In some embodiments, the venue correlation score is further based on a confidence level assigned to the second user venue information. In some embodiments, the social metric is further defined by at least one of a length of a relationship between the first user and the second user; and the relationship being personal or professional. In some embodiments, the threshold value is based on at least one of a received threshold value; a distribution of relationship scores associated with a plurality of users; and an application of a machine learning algorithm to a plurality of user location information and user venue information These and other capabilities of the disclosed subject matter will be more fully understood after a review of the following figures, detailed description, and claims. It is to be understood that the phraseology and terminology employed herein are for the purpose of description and should not be regarded as limiting.

BRIEF DESCRIPTION OF FIGURES

Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

Techniques are described herein to overcome the constraints of tracking an individual user's location by leveraging a user's derived social network. That is, even if a user has not disclosed her exact location, if the user is co-dwelling with a social connection who has disclosed his location, the user's most likely location can be inferred based on the location of the social connection.

In some embodiments, the techniques described herein leverage a user's social network and other data sources to make reliable inferences on a user's exact location based on GPS information associated with the user (e.g., generated by their phone). In some embodiments, an amount of time a user dwells at a particular location (also referred to herein as a "visit") with reference to an amount of time a social connection dwells at the same location also informs venue information associated with the user.

In some embodiments, the systems and methods described herein receive information about two users A and B and information about their dwelling (latitude and longitude, horizontal accuracy, arrival and departure time). The systems and methods described herein determine that A was located at venue V (e.g. Restaurant Mario) (because the user told the system and/or because of strong algorithmic evidence), and can tag B at the same venue by leveraging social connection information between A and B and other contextual information (e.g., temporal and geographic proximity of the users' respective visits, users' own preferences and habits).

Various techniques can be used to gather user information and to create a derived social network, for example, as described in FIGS. 1 and 2 below. Additionally, systems and methods for gathering user information to create and to modify a derived social network are described in more detail in U.S. application Ser. No. 15/298,353, titled "System and Method for Detecting Interaction and Influence in Networks," filed Oct. 20, 2016, the contents of which are incorporated herein.

Figure 1:
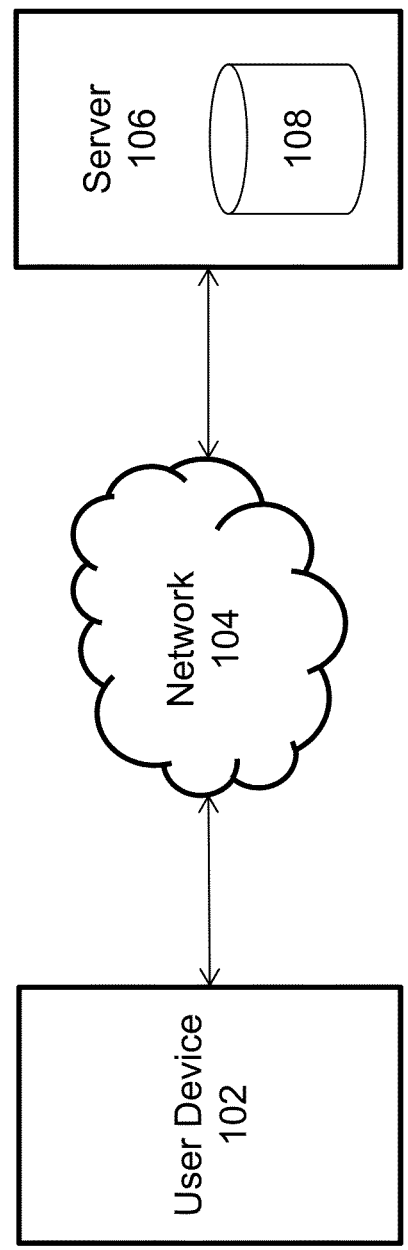
FIG. 1 is a system diagram showing a networked system, according to some embodiments of the present disclosure.

FIG. 1 is a system diagram showing a networked system 100, according to some embodiments of the present disclosure. FIG. 1 shows a user device 102, network 104, server 106, and a database 108.

A user device 102 can be associated with a user participating in the location tracking systems and methods described herein and can collect information from users participating in the networked system. In some embodiments, the user device 102 can include any computerized device capable of recording and transmitting information about a user's proximity to another user or to a location. In some embodiments, the computerized device can include a smart phone, tablet, computer, laptop, car, or smart watch that may be installed with a mobile application that facilitates the gathering of data.

In some embodiments, the user device 102 can include vehicle-mounted data collection agents such auto onboard diagnostics modules, telemetrics and telematics modules, transponders, onboard GPS modules, and other systems that collect relevant data.

In some embodiments, user device 102 can include consumer wearable devices or fitness monitors such as the Jawbone Up, Fitbit Charge, or Apple Watch devices.

In some embodiments, data can be transmitted directly from user device 302 to network 304 (e.g., in the case of the mobile application) or can be collected through an intermediate step. For example, in the case of a vehicle telemetrics system, an intermediate module may be utilized to gather information from the onboard device and transmit it over a wireless link to a smartphone where it may then be transmitted to network 304.

In some embodiments, a mobile application can be installed on a user's smartphone computing device and provide the user with the ability to opt-in to various data collection mechanisms. For example, a user can permit the system described herein, via the mobile app, to gather the user's contacts, Facebook friends, Instagram friends, position data over time, and payments made using the smartphone computing device, telephone and messaging patterns.

In some embodiments, a user device 102 can take the form of an application or applets that is provided with various connected devices. For example, an app embedded in a DVR could transmit data concerning viewing habits and preferences, while software embedded in a car's navigation system could transmit data concerning position and driving patterns.

It will be appreciated by those of skill in the art that there is no limit to the type and variety of user devices that can be utilized with systems described in the present disclosure.

Network 104 enables communication between the user device 102. Network 104 can be public network such as the Internet, with each of the user device 102 and server 104 connected via a gateway using communication protocols such as Wi-Fi, Ethernet and 4G wireless. Alternatively, network 104 can be a closed network such as a local area network (LAN) with the various components of the relationship analytics system not accessible on the open Internet. In some embodiments, communications via network 304 can be encrypted, or additional security protocols me be utilized such as virtual private network (VPN) or secure socket shell (SSH) tunneling.

Server 106 can include one or more server computers implementing a database 108 for holding the data gathered about the user. In some embodiments, a particular configuration of server 106 can depend on a number of factors such as the type of database, the anticipated size of the database, and user performance expectations. In some embodiments, the system is scalable and additional processing capacity can be added as demand increases.

Figure 2:
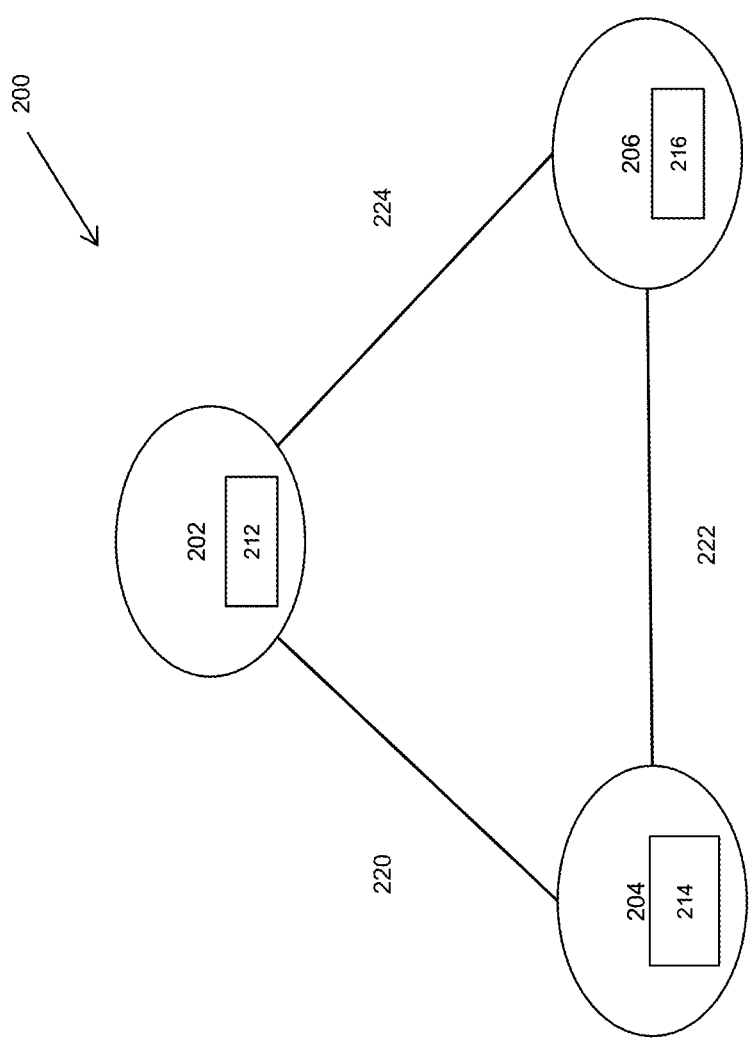
FIG. 2 is a diagram showing a social graph, according to some embodiments of the present disclosure.

FIG. 2 is a diagram showing a social graph 200, according to some embodiments of the present disclosure. The social graph 200 includes nodes 202 204 206, node parameters 212 214 216, and links 220 222 224.

As described above, a social graph 200 is one way to represent entities and relationship between entities. Other methods of visualizing entities and relationship to entities (e.g., matrix) are equally applicable to the systems and methods described herein.

Nodes 202 204 206 represent entities and are each associated with a set of parameters 212 214 216. As described above, the parameters 212 214 216 can be assigned to the nodes 202 204 206, respectively, based on information received from data collection nodes 110. The entities can include people, organizations, and devices. The parameters 212 214 216 can include information identifying the entity and describing at least one of a relationship to a location, activity, or transaction associated with the entity. For example, if the entity is as person, the parameters can include an identification number, birthday, gender, employer, credit rating, location (and location accuracy), salary, recent transactions, and recent activities. As another example, if the entity is a company, the node can include properties such as company ID, vendor ID, company name, year of founding, address, industry, industry ranking, credit rating, location information, represented as the latitude and longitude of the company, and an indicator of the confidence in the accuracy of the location coordinates. Company location information can be useful for determining the movement and interaction of individuals. In some embodiments, parameter information can be associated with a time that the parameter information is observed, received or processed.

As used herein, transactions can refer to purchases (e.g., clothes, food, travel, merchandise) and activities can refer to events (e.g., sporting events, classes, parties).

A node (e.g., node 202) can be connected to other nodes (e.g., node 204 and node 206) via links 220 222 224. The links can represent the strength of relationships between entities or the strengths between parameters associated with the entities. The strength of a relationship between entities can vary depending on the nature of the entities involved and the evidence at hand. In some embodiments and as described in more detail below, smaller scores are considered better and are analogous to distance. A relationship strength value can be referred to as the distance between nodes and measured in units referred to herein as axons.

In embodiments, sub-graphs representing the effective reach of an entity are provided. These sub-graphs—known as ego networks—are distance-limited sub-graphs for an entity. In embodiments, once the social graph has been created, ego networks are the basic unit for all further processing. An ego network can be generated using the following guidelines:

A maximum traversal distance can be set that restricts the sub-graph to paths that are less than the maximum traversal distance measured in axons. In some embodiments, the maximum traversal distance may be set to 100,000 axons, but others settings can be utilized depending on the application.

Hop penalties can be applied to the distance for each hop in the path by multiplying the distance by the penalty. For example, if a first hop between nodes has a penalty of 5 and the first hop's distance was 100 axons, it would effectively have a scaled distance of 500 axons.

A traversal timeout can be incorporated to restrict large networks that can cause a processing delay. The traversal timeout is a palliative measure that should not be necessary in a well-balanced graph. In some embodiments, a traversal timeout may be set to 15 seconds, but variations may be utilized depending on the system.

Depending on whether the root of the ego network is an individual or an entity, additional restrictions on ego network generation can be enforced such as limitations on the network characteristics that are considered during traversal.

In some embodiments, different social graphs can be created based on a desired commonality factor between entities. The relevant ego networks can be distinctive from each other in this case. For example, in determining an entity's effects on node 202, link 220 to node 204 may be stronger if the inquiry relates to the entity that will have the most correlation to node 202 in terms of relevant restaurant suggestions in City A, while link 224 to node 206 may be stronger if the inquiry relates to the entity that will have the most correlation to node 202 in terms of relevant retailer for casual clothing.

In some embodiments, and as described in more detail below, information associated with users' visits to various locations (and possibly venues) table can be used to compute the similarity between every pair of users. If two users are found to be similar enough, they can become an entity in the overall connection graph. For every connection, there are two nodes (e.g., 202 and 204) representing each of the two users—and a weight (or score) (e.g., 220), which is a real number between 0 and 1 indicating the strength of the connection between the two nodes.

In some embodiments, when two users spend a relatively high proportion of time in close proximity, the confidence level associated with the presence of a social connection between the users increases accordingly. Closer connections will often spend more time together, in diverse locations (e.g., not just at work, but also at the bar after work, and at one user's home together on the weekend). More distant connections will often spend relatively less time together, in less varied locations.

A commonality factor can be determined for an entity based on a changed parameter for the entity. For example, when an entity travels to a new location, a social graph can be created based on factors that are relevant to traveling to a new place (e.g., hotel, rental car, restaurants). As another example, the changed parameter can include a particular purchase or a noticed pattern of purchases. In some embodiments, changed parameters can determine an entity's familiarity with an area. The social graph can look very different in an entity's home town than in a place the entity has never visited before. For example, a hotel can have a different relevance value in an entity's home town than it does in a new place that the entity is visiting (a place with less familiarity). In some embodiments, changed parameter information includes both a location and time associated with the changed parameter.

In some embodiments, a scoring relationship strength can vary depending on the nature of the entities involved and the information available. For example, a relationship between two individuals may be assessed using metrics such as the length of that relationship, whether the relationship is personal or professional, how often two individuals are in the same location, and how often the individuals visit similar locations, among others. Similarly, the relationship between an individual and a particular brand may include how long the individual has been purchasing that brand, how often the individual purchases competing brands, and how often one product is purchased at the same time as another product, among others. While there may be overlap among relationship characteristics depending on the type, there may also be differences.

In measuring the strength of a relationship a score can be assessed in axons, which was mentioned briefly above. Smaller scores are considered better, and are analogous to distance. In addition to scoring relationships, the centrality of an entity can also be scored to quantify the entity's connectedness within the network, which in turn measures the influence of that entity.

Individual relationships may be represented using weighted interconnections that score the relationships based upon the characteristics of the relationships. In embodiments, characteristics include duration, vintage, interaction, trust/variety, control, and harmony. Additional details describing the calculation of weights for connections between two users can be found in U.S. application Ser. No. 15/298,353, titled "System and Method for Detecting Interaction and Influence in Networks," filed Oct. 20, 2016, the contents of which are incorporated herein.

Figure 3:
FIG. 3 is a diagram showing a GPS information associated with a user visit, according to some embodiments of the present disclosure.

FIG. 3 is a diagram showing a GPS information associated with a user visit, according to some embodiments of the present disclosure. FIG. 3 shows a centroid 300, and a centroid radius 301.

In some embodiments, a "visit" is a GPS pair (lat, lon) with a start and end time (e.g. "2016/28/11 10:30:00+00: 00") generated by a particular user device (e.g. mobile phone). The visit can be represented in space with a circle: a centroid 300 is where the visit is recorded by the device and the radius 301 depicts the horizontal accuracy of that recording, as judged by the device. Generally, the bigger the radius, the less confidence there is about the position of the user.

Figure 4:
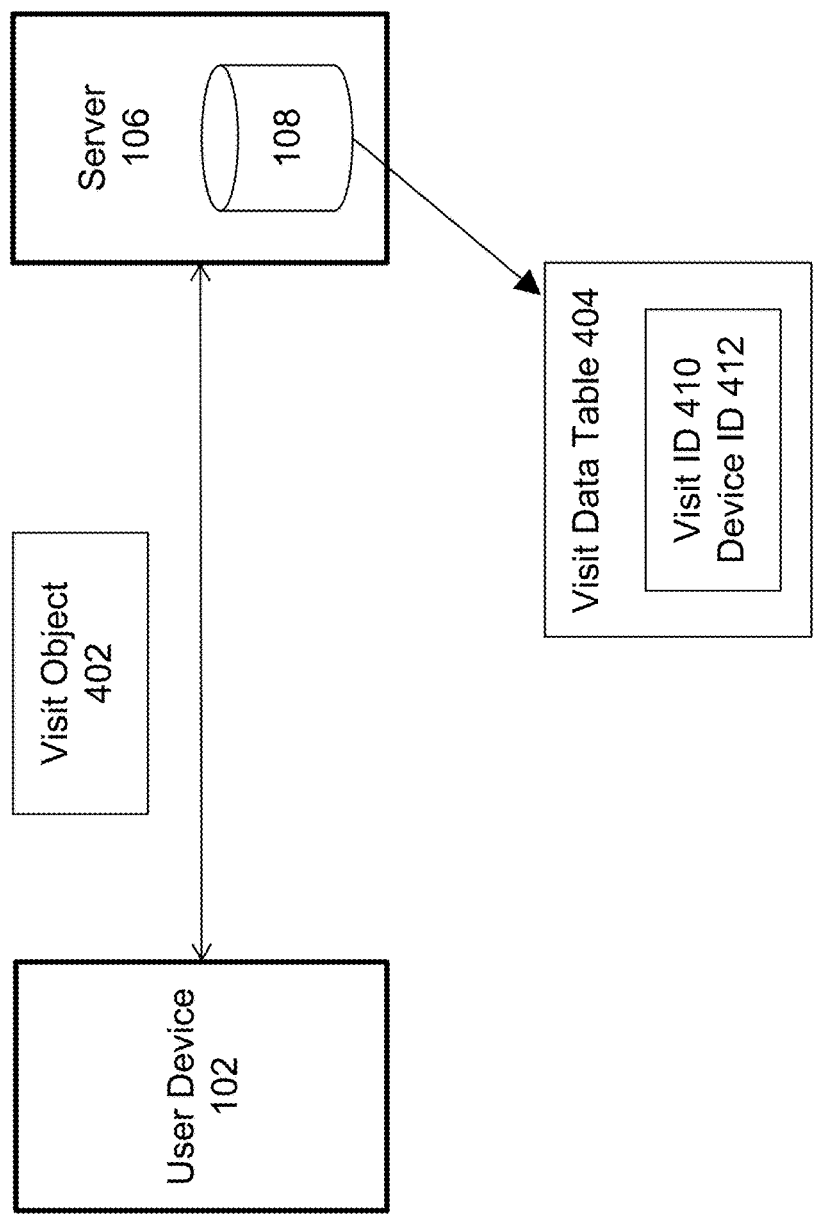
FIG. 4 is a diagram showing a collection of location information associated with a user visit, according to some embodiments of the present disclosure.

FIG. 4 is a diagram showing a collection of location information associated with a user visit, according to some embodiments of the present disclosure. FIG. 4 shows a visit object 402, database 404, a user data table 406, visit ID 410, and device ID 412.

Visit object 402 is uploaded from user device 102 to server 106. Visit object 402 includes location information for the user including centroid, accuracy, start and end time. The format of the visit object can be any format agreed upon by the user device 102 and server 106, for example in JSON format as illustrated below:

{
  "deviceId": AAAABBBB,
  "lat": 40.706134,
  "lon": −74.013672,
  "hAccuracy": 100,
  "startTime": "2016/11/28 10:30:00+00:00",
  "endTime": "2016/11/28 12:32:00+00:00"
}

Server 106 can persist visit object 402 information in a database 108 for further analysis. The information in the database 108 can be organized in a visit data table 404 that assigns to each object a visit ID 410 and device ID 412 in the table 404. Any data structure that stores the association between IDs and the object can be used, for example, an integer table as shown below:

| Visit Id | Device Id |
|---|---|
| 111 | AAAABBBB |
| 222 | CCCCDDDD |
| ... | ... |

As described in more detail below in the text accompanying FIG. 5, the visit ID 410 can be used to correlate a venue with the user.

Figure 5:
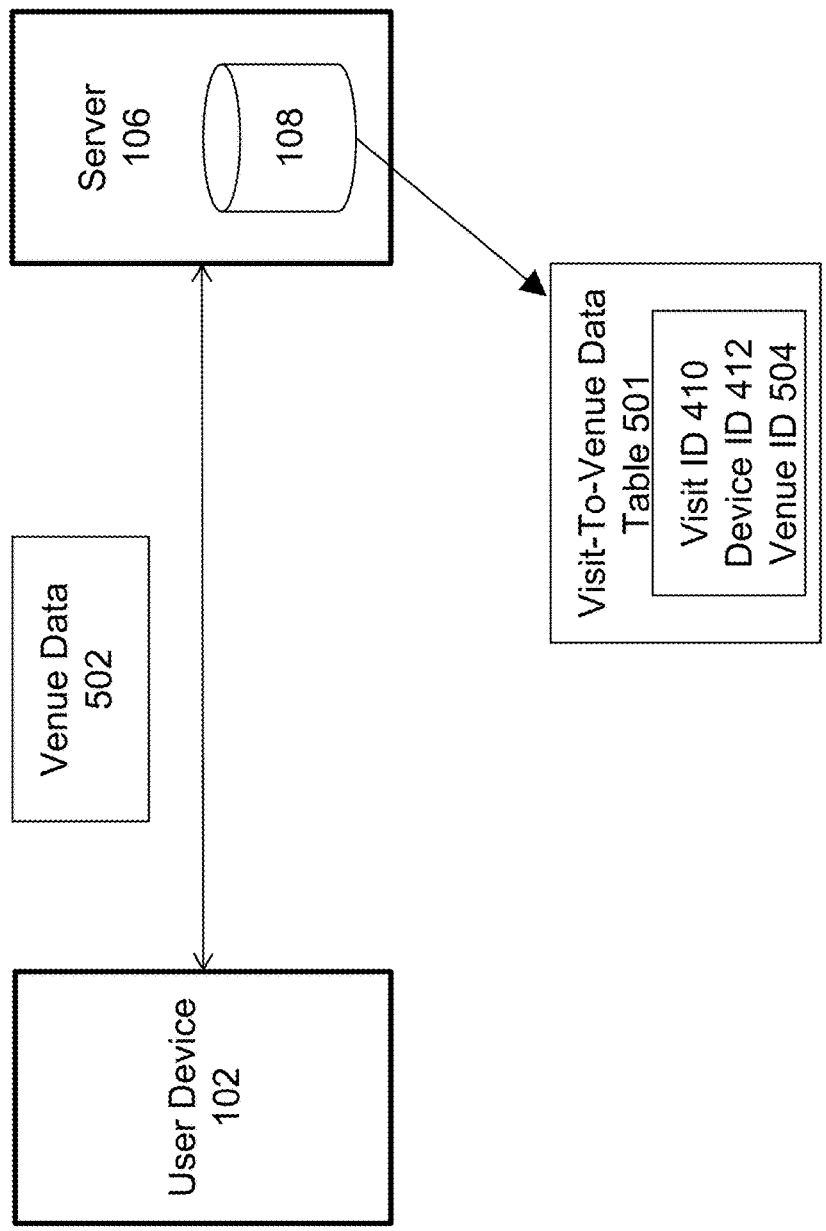
FIG. 5 is a diagram showing a collection of venue information associated with a user visit, according to some embodiments of the present disclosure.

FIG. 5 is a diagram showing a collection of venue information associated with a user visit, according to some embodiments of the present disclosure. FIG. 5 shows venue data 502 and venue ID 504 stored in data table 501.

Venue data 502 corresponds to venue information associated with a user's location. In some embodiment, venue data 502 is obtained via a "check-in." A "check-in," as used herein, refers to an action that is performed voluntarily by a user of the user device 102 confirming that a visit should be tagged with a venue (e.g., Restaurant Mario). Venues can be provided to an application running on the user device 102 from a table of venues. Other venue confirmation procedures that map a visit to a venue can also be used (e.g., credit card transaction, strong algorithmic evidence from other software applications). The venue information can be tagged with a venue ID 504, for example, a shown below:

| Venue Id | Name |
|---|---|
| 2222 | Bar X |
| 3333 | Restaurant Y |
| ... | ... |

Venue data 502, which has been confirmed, can be uploaded as an object mapping the visit ID 410 with a venue ID 504. A venue ID 504 can correspond to a unique ID assigned to a venue. The venue data 502 object can be of any format agreed upon by the user device 102 and server 106, for example in JSON format as illustrated below:

{
  "visitId": 111
  "venueId": 2222
}

The venue ID 504 can be stored in the database in a manner that correlates the visit ID 111 with the venue ID 504. For example, an integer table can be used as shown below:

| Visit Id | Device Id | Venue ID |
|---|---|---|
| 111 | AAAABBBB | 2222 |
| 222 | CCCCDDDD | ... |
| ... | ... | ... |

Figure 6:
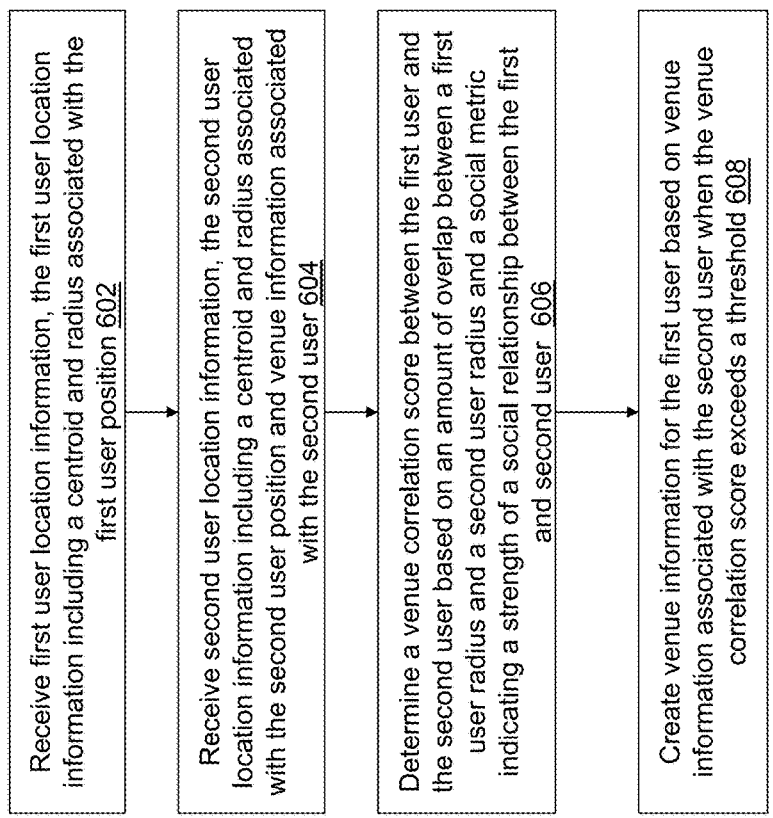
FIG. 6 is flowchart showing an assignment of venue information for a user, according to some embodiments, of the present disclosure.

FIG. 6 is flowchart showing an assignment of venue information for a user, according to some embodiments, of the present disclosure.

Referring to step 602, first user location information is received, the first user location information including a centroid and radius associated with the first user position. As described above, location information can include a user location (e.g., expressed as a centroid using longitude and latitude), a duration associated with a user being present at the location (e.g., measured by a start time and end time), and a confidence level of the user being at the location (e.g., measured by a radius associated with the centroid).

Referring to step 604, second user location information is received, the second user location information including a centroid and radius associated with the second user position and venue information associated with the second user. As described above, location information can include a user location (e.g., expressed as a centroid using longitude and latitude), a duration associated with a user being present at the location (e.g., measured by a start time and end time), and a confidence level of the user being at the location (e.g., measured by a radius associated with the centroid).

Also as described above, the server receives information related to the particular venue the second user is at. A venue can be a location (lat, lon pair) augmented with semantic meta-data: e.g., category (restaurant, hotel, stadium, etc.), name, hours of operations etc. In some embodiments, "check-in" information is also associated with a confidence level regarding the reliability of the matching between the dwell and the venue in question. Factors that contribute to the reliability include user confirmation of the venue (e.g., a manual check-in by a user regarding the venue), third-party verification of the venue (e.g., purchases made by a user at a venue) and other algorithmic evidence.

Referring to step 606, a relationship score is determined between the first user and the second user based on an amount of overlap between a first user radius and a second user radius and a social metric indicating a strength of a social relationship between the first and second user. Note that the following is only an example of such an algorithm, which can take various forms (e.g., threshold decision, probabilistic decision trees, etc.) is:

temporal overlap metric*spatial overlap metric*social connection metric>threshold user2 will be assigned user1 venue information In some embodiments the threshold can be chosen to be relatively small, for example to gather more user data (e.g., to trigger more user confirmation and improve user engagement with the software application), while in other embodiments the threshold can be set to higher as to minimize the number of false positives (for example, in highly sensitive data application, one may prefer to make less inferences but also less mistakes).

Referring to step 608, venue information is created for the first user based on venue information associated with the second user when the venue correlation score exceeds a threshold. For example, assume the following scenario:
- USER 1, visit centered at <40.708793, −74.011013>, from 09:10 to 09:45
- USER 2, visit centered at <40.708616, −74.011145>, from 09:12 to 09:48
- USER 1 confirms the visit at Starbucks located at 115 Broadway (10006, New York).

For the two users, the value of the features in the decision-making algorithm can be calculated that can perform venue matching for USER 2 if conditions are met, for example:
- Temporal overlap metric: 33/38=0.86 (overlap in time as measured as a Jaccard distance between the set of minutes in the two intervals)
- Spatial overlap metric: 1−0.044=0.956 (the distance between the two visits (point-to-point) is 0.022 km, scaled to a theoretical maximum of 0.5 km)
- Social connection metric: 0.75 (property read from the social graph, assuming they are close friends)

Each of the features noted above can be calculated in different ways (e.g.: horizontal accuracy could be used explicitly in the spatial overlap). Moreover, the algorithm making the final decision can be different in different embodiments: for example, the three features can be multiplied and a threshold heuristically set based on domain-specific knowledge (similar to the IF-THEN relationship illustrated above); or, as another example, the distribution of these scores can be estimated and the threshold decided as the value marking the nth percentile (i.e. the value making n % of scores as not strong enough to allow venue-matching). Finally, with enough training data, a machine learning algorithm suitable for a decision problem can be used (e.g. logistic regression, decision tree) to learn the optimal way to make the final venue-matching decision based on spatio-temporal features and the social connection.

Figure 7:
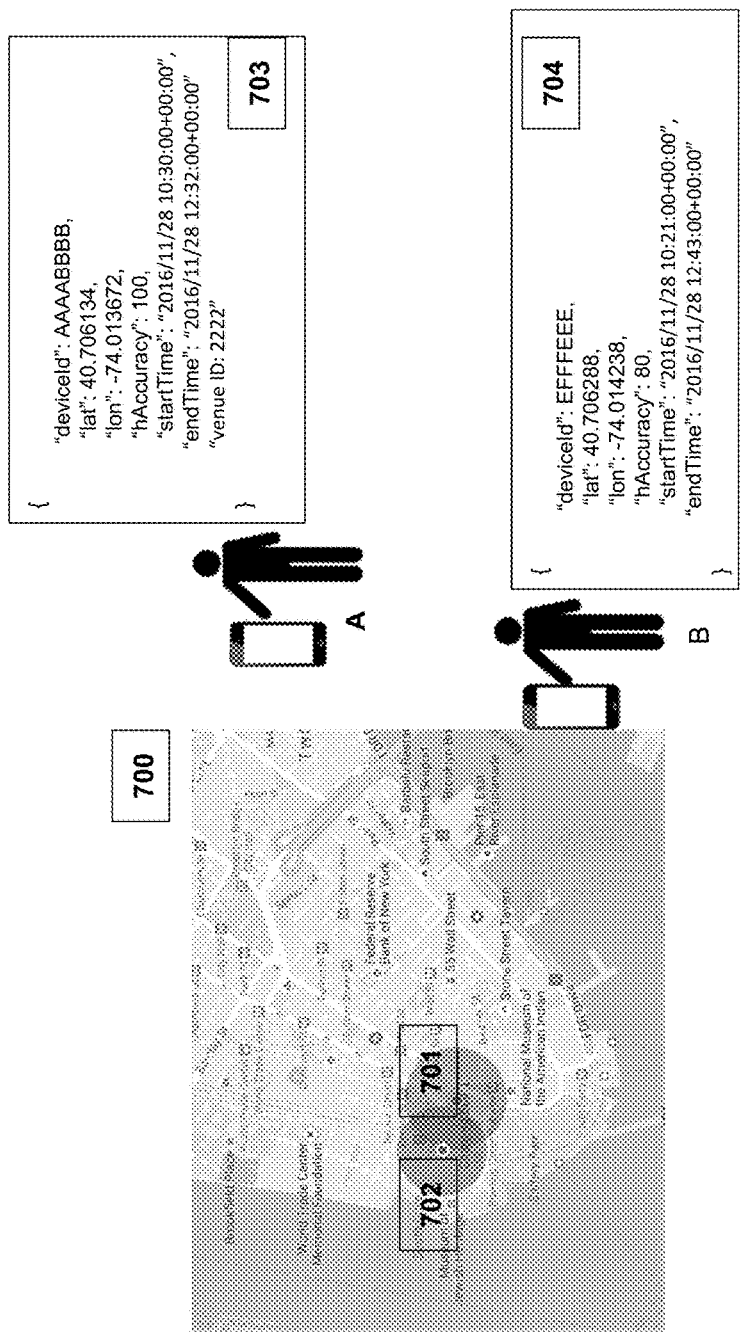
FIG. 7 is a diagram showing an example of assigning venue information, according to some embodiments of the present disclosure.

FIG. 7 is a diagram showing an example of assigning venue information, according to some embodiments of the present disclosure. FIG. 7 shows a spatial overlap map 700, user A centroid 701, user B centroid 702, user A visit object 703 and user B visit object 704.

User A, as referred to with reference to FIG. 7, is a user having already having a confirmed venue, while user B is a user being assigned a venue based on the systems and methods described herein. As shown in spatial overlap map 700, user A centroid 701 and user B centroid 702 are very close and the horizontal (radial) components of each centroid overlap. Even though user A centroid 701 and user B centroid 702 do not match exactly (e.g., the GPS signals (the visits) generated by their devices are slightly displaced), there is a chance the two users are in the same venue.

User A visit object 703 and user B visit object 704 include location information. The location information includes device ID, latitude, longitude, hAccuracy (horizontal accuracy in latitude/longitude, as opposed to vertical accuracy in altitude), start time and end time. As shown in FIG. 7, the time at which user A and user B are found at the locations shown in space overlap map 700 overlaps (e.g., start time and end time for user A is 10:30 and 12:32 while the start time and end time for user B is 10:21 and 12:43). That is, user B's visit begins just a few minutes before and ends just a few minutes after the user A's visit. Generally, the more closely users' visit times match, the more likely they are to be together.

User A visit object 703 further includes venue ID information, while user B visit object 704 does not include venue ID information. As described above, venue ID information can be assigned when a confidence level regarding the reliability of the venue information exceeds a threshold. Factors that contribute to the reliability of the venue information include user confirmation of the venue (e.g., a manual check-in by a user regarding the venue) and third-party verification of the venue (e.g., purchases made by a user at a venue). In this example, user A visit object 703 has venue information because the system determined that user A had reliable venue information.

User B can be assigned the venue information of user A based on the strength of the correlation between their location information and their social connection information. As described, the systems and methods described herein can consider the strength of the social connections between A and B as described above in FIG. 2 and in U.S. application Ser. No. 15/298,353, titled "System and Method for Detecting Interaction and Influence in Networks," filed Oct. 20, 2016, the contents of which are incorporated herein. Assuming user A and user B are close social connections (e.g., have a score of 0.96) and the location information overlap is significant (exceeds a confidence threshold), the venue ID of user A can either be assigned or suggested to user B.

As another example, assume a group of users all go to a restaurant together. Their mobile location points are displaced, making it appear that they are most likely at another venue across the street; moreover, there are several possible venues within the location points' radii of uncertainty. However, one user discloses her location (e.g., paying for the bill with a credit card or tagging a photo with a venue), thus confirming her presence at that specific restaurant. The system described herein can determine the first user is closely geo-located to other individuals with whom she has strong social ties and can extrapolate that the other individuals are at that same location.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

The invention claimed is:

1. A computerized method of determining a location of a user based on locations of other users, the computerized method comprising:
    receiving, at a computing device, first user location information associated with a first user from a first user device;
    receiving, at the computing device, second user location information associated with a second user from a second user device, the second user further associated with second user venue information;
    calculating, at the computing device, a spatial overlap metric based on a distance between the first user location information and the second user location information;
    determining, at the computing device, a venue correlation score between the first user and the second user based on the spatial overlap metric between the first user location information and the second user location information and a social metric indicating a strength of a social relationship between the first user and second user, the social relationship being defined at least in part by a number of times and an amount of time a first user is in a proximate location to the second user prior to receiving the first user location information and the second user location information; and
    creating, at the computing device, venue information for the first user based on the second user venue information when the venue correlation score exceeds a threshold value.

2. The computerized method of claim 1, wherein the first user location information is associated with a first latitude and longitude and the second user location information is associated with a second latitude and longitude.

3. The computerized method of claim 1, wherein:
    the first user location information further includes a first user device identifier and a first user duration, the first user duration including a start time and end time corresponding to the first user being associated with the first user location information; and
    the second user location information further includes a second user identifier and a second user duration, the second user duration associated with start time and end time corresponding to the second user being associated with the second user location information.

4. The computerized method of claim 3, wherein the venue correlation score is based on an amount of overlap between the first user duration and the second user duration.

5. The computerized method of claim 1, wherein the venue correlation score is further based on a confidence level assigned to the second user venue information.

6. The computerized method of claim 1, wherein the social metric is further defined by at least one of:
   a length of a relationship between the first user and the second user; and
   the relationship being personal or professional.

7. The computerized method of claim 1, wherein the threshold value based on at least one of:
   a received threshold value;
   a distribution of relationship scores associated with a plurality of users; and
   an application of a machine learning algorithm to a plurality of user location information and user venue information.

8. A computing system for determining a location of a user based on locations of other users, the computing system comprising:
   a processor; and
   a memory coupled to the processor and including computer-readable instructions that, when executed by the processor, cause the processor to:
   receive first user location information associated with a first user from a first user device;
   receive second user location information associated with a second user from a second user device, the second user further associated with second user venue information;
   calculate a spatial overlap metric based on a distance between the first user location information and the second user location information;
   determine a venue correlation score between the first user and the second user based on the spatial overlap metric between the first user location information and the second user location information and a social metric indicating a strength of a social relationship between the first user and second user, the social relationship being defined at least in part by a number of times and an amount of time a first user is in a proximate location to the second user prior to receiving the first user location information and the second user location information; and
   create venue information for the first user based on the second user venue information when the venue correlation score exceeds a threshold value.

9. The computing system of claim 8, wherein the first user location information is associated with a first latitude and longitude and the second user location information is associated with a second latitude and longitude.

10. The computing system of claim 8, wherein:
    the first user location information further includes a first user device identifier and a first user duration, the first user duration including a start time and end time corresponding to the first user being associated with the first user location information; and
    the second user location information further includes a second user identifier and a second user duration, the second user duration associated with start time and end time corresponding to the second user being associated with the second user location information.

11. The computing system of claim 10, wherein the venue correlation score is based on an amount of overlap between the first user duration and the second user duration.

12. The computing system of claim 8, wherein the venue correlation score is further based on a confidence level assigned to the second user venue information.

13. The computing system of claim 8, wherein the social metric is further defined by at least one of:
    a length of a relationship between the first user and the second user; and
    the relationship being personal or professional.

14. The computing system of claim 8, wherein the threshold value is based on at least one of:
    a received threshold value;
    a distribution of relationship scores associated with a plurality of users; and
    an application of a machine learning algorithm to a plurality of user location information and user venue information.

15. A non-transitory computer readable medium having executable instructions operable to cause an apparatus to:
    receive first user location information associated with a first user from a first user device;
    receive second user location information associated with a second user from a second user device, the second user further associated with second user venue information;
    calculate a spatial overlap metric based on a distance between the first user location information and the second user location information;
    determine a venue correlation score between the first user and the second user based on the spatial overlap metric between the first user location information and the second user location information and a social metric indicating a strength of a social relationship between the first user and second user, the social relationship being defined at least in part by a number of times and an amount of time a first user is in a proximate location to the second user prior to receiving the first user location information and the second user location information; and
    create venue information for the first user based on the second user venue information when the venue correlation score exceeds a threshold value.

16. The non-transitory computer readable medium of claim 15, wherein the first user location information is associated with a first latitude and longitude and the second user location information is associated with a second latitude and longitude.

17. The non-transitory computer readable medium of claim 15, wherein:
    the first user location information further includes a first user device identifier and a first user duration, the first user duration including a start time and end time corresponding to the first user being associated with the first user location information; and
    the second user location information further includes a second user identifier and a second user duration, the second user duration associated with start time and end time corresponding to the second user being associated with the second user location information.

18. The non-transitory computer readable medium of claim 17, wherein the venue correlation score is based on an amount of overlap between the first user duration and the second user duration.

19. The non-transitory computer readable medium of claim 15, wherein the venue correlation score is further based on a confidence level assigned to the second user venue information.

20. The non-transitory computer readable medium of claim 15, wherein the social metric is further defined by at least one of:

a length of a relationship between the first user and the second user; and the relationship being personal or professional.

\* \* \* \* \*